(12) United States Patent
Ortiz et al.

(10) Patent No.: US 9,031,537 B2
(45) Date of Patent: May 12, 2015

(54) ELECTRONIC WIRELESS HAND HELD MULTIMEDIA DEVICE

(75) Inventors: Luis M. Ortiz, Albuquerque, NM (US); Kermit D. Lopez, Albuquerque, NM (US)

(73) Assignee: Mesa Digital, LLC, Albuquerque, NM (US)

( * ) Notice: Subject to any disclaimer, the term of this patent is extended or adjusted under 35 U.S.C. 154(b) by 894 days.

(21) Appl. No.: 12/257,205

(22) Filed: Oct. 23, 2008

(65) Prior Publication Data

US 2009/0047992 A1 Feb. 19, 2009

Related U.S. Application Data

(63) Continuation of application No. 09/887,492, filed on Jun. 22, 2001, now Pat. No. 7,630,721, and a continuation of application No. 09/902,348, filed on Jul. 10, 2001.

(60) Provisional application No. 60/214,339, filed on Jun. 27, 2000, provisional application No. 60/243,561, filed on Oct. 26, 2000.

(51) Int. Cl.
*H04M 3/16* (2006.01)
*G07C 9/00* (2006.01)
(Continued)

(52) U.S. Cl.
CPC ............ *G07C 9/00674* (2013.01); *G06Q 10/06* (2013.01); *H04L 63/083* (2013.01);
(Continued)

(58) Field of Classification Search
USPC ............. 342/357.1; 713/300; 455/509, 552.1, 455/41.1–41.3, 410–412.1, 3.05, 455/410–414.2; 702/159; 380/258; 379/88.13, 142.05, 903, 908, 915, 916; 705/7.14, 1.514
See application file for complete search history.

(56) References Cited

U.S. PATENT DOCUMENTS 4,433,387 A * 2/1984 Dyer et al. .................... 702/159
5,189,632 A 2/1993 Paajanen et al. ......... 364/705.05
(Continued)

FOREIGN PATENT DOCUMENTS

WO WO 00/04732 1/2000 ............... H04Q 7/20

OTHER PUBLICATIONS

Billinghurst, K., "Wireless Internet adds a new dimension," Contact Magazine (1999) No. 14, Ericsson, Exhibit 2 of Case No. 1:10-cv-00433-JB-KBM, 3 pages.
(Continued)

*Primary Examiner* — Md S Elahee
(74) *Attorney, Agent, or Firm* — Luis M. Ortiz; Kermit D. Lopez; Ortiz & Lopez, PLLC

(57) ABSTRACT

An electronic wireless hand held multimedia device includes a microprocessor and more than one wireless transceiver modules enabling wireless communications over a variety of standards, including Cellular (e.g., GSM, CDMA, GPRS, 3G), 802.11 (e.g., WLAN), and short range (e.g., Bluetooth, infrared, RFID), for the retrieval, processing and delivery of multimedia data to/from remote data resources (e.g., Internet, servers). The hand held device can include any of: a touch sensitive display screen configured to display multimedia data including video, text and GPS maps, and accept user input; a cartridge reader configured to exchange data with an electronic cartridge; a GPS module configured to operate with mapping resources and provide location information and GPS mapping; a mobile payment module enabling mobile payments via a variety of billing arrangements; a security module enabling protected data management and communications security; a video camera enabling the capture, storage, processing and transmission of video and pictures.

37 Claims, 6 Drawing Sheets

(51) Int. Cl.
*G06Q 10/06* (2012.01)
*H04L 29/06* (2006.01)
*H04W 4/02* (2009.01)
*H04L 29/08* (2006.01)

(52) U.S. Cl.
CPC .......... *H04L63/0861* (2013.01); *H04L 63/102* (2013.01); *H04W 4/02* (2013.01); *H04L 67/1095* (2013.01); *H04L 67/306* (2013.01); *H04L 67/04* (2013.01); *H04L 67/02* (2013.01); *H04L 67/2842* (2013.01); *H04L 67/18* (2013.01); *H04L 67/289* (2013.01); *H04L 69/329* (2013.01)

(56) References Cited

U.S. PATENT DOCUMENTS

| | | | | |
|---|---|---|---|---|
| 5,485,504 | A | | 1/1996 | Ohnsorge .................... 379/58 |
| 5,491,507 | A | | 2/1996 | Umezawa et al. ............... 348/14 |
| 5,719,936 | A | | 2/1998 | Hillenmayer ................ 379/447 |
| 5,726,660 | A | * | 3/1998 | Purdy et al. ................. 342/357.1 |
| 5,949,484 | A | | 9/1999 | Nakaya et al. ................ 348/384 |
| 6,069,648 | A | | 5/2000 | Suso et al. ........................ 348/14 |
| 6,085,112 | A | | 7/2000 | Kleinschmidt et al. ........ 455/556 |
| 6,137,525 | A | | 10/2000 | Lee et al. ......................... 348/14 |
| 6,278,884 | B1 | | 8/2001 | Kim ............................... 455/556 |
| 6,289,464 | B1 | * | 9/2001 | Wecker et al. ................. 713/300 |
| 6,366,614 | B1 | | 4/2002 | Pian et al. ................. 375/240.02 |
| 6,434,403 | B1 | | 8/2002 | Ausems et al. ................ 455/556 |
| 6,549,625 | B1 | * | 4/2003 | Rautila et al. .................. 380/258 |
| 6,615,186 | B1 | * | 9/2003 | Kolls .......................... 705/14.51 |
| 6,694,150 | B1 | | 2/2004 | Standke et al. ............. 455/552.1 |
| 6,714,797 | B1 | | 3/2004 | Rautila ....................... 455/552.1 |
| 6,965,868 | B1 | * | 11/2005 | Bednarek ..................... 705/7.14 |
| 7,321,783 | B2 | | 1/2008 | Kim ........................... 455/556.1 |
| 2001/0041599 | A1 | | 11/2001 | Pirkola et al. ................. 455/566 |
| 2001/0048685 | A1 | | 12/2001 | Park et al. ...................... 370/401 |
| 2007/0275746 | A1 | * | 11/2007 | Bitran .......................... 455/509 |

OTHER PUBLICATIONS

George, T., "PDAs Bring Sports Fans Closer to Athletes," InformationWeek (Dec. 14, 2001), http://www.informationweek.com/pdas-bring-sports-fans-closer-to-athlete/6508218, Exhibit 4 of Case No. 1:10-cv-00433-JB-KBM, 2 pages.

Strupczewski, J. "Wireless gadgets give sports fans closer look," Dec. 14, 2001 Reuters News 12:50:05, Exhibit 5 of Case No. 1:10-cv-00433-JB-KBM, 4 pages.

Tamm, G., "100,000 following sailing on the net," Contact (2000) No. 3, Mar. 2, Ericsson, Exhibit 3 of Case No. 1:10-cv-00433-JB-KBM, 3 pages.

Tamm, G., "Mobile Internet takes you to the ice," Contact (2000) No. 8, May 18, Ericsson, Exhibit 1 of Case No. 1:10-cv-00433-JB-KBM, 3 pages.

Appeal Decision and Transcript, U.S. Appl. No. 10/620,098, dated Jan. 29, 2010 and Feb. 2, 2010, 19 pages.

* cited by examiner

ELECTRONIC WIRELESS HAND HELD MULTIMEDIA DEVICE

PRIORITY CLAIM AND CROSS-REFERENCE TO RELATED APPLICATIONS

This patent application is a continuation of U.S. patent application Ser. No. 09/887,492, entitled "Systems, Methods and Apparatuses for Brokering Data Between Wireless Devices and Data Rendering Devices," which was filed on Jun. 22, 2001, and claims priority to U.S. Provisional Patent Application Ser. No. 60/214,339, entitled "Systems, Methods and Apparatuses for Brokering Data Between Wireless Devices and Data Rendering Devices," which was filed on Jun. 27, 2000. This patent application is also a continuation of U.S. patent application Ser. No. 09/902,348, entitled "Providing Multiple Perspectives of a Venue Activity to Electronic Wireless Hand-Held Devices," filed on Jul. 10, 2001, which claims the benefit of U.S. Provisional Application Ser. No. 60/243,561, which was filed on Oct. 26, 2000. All the aforementioned applications are incorporated herein by reference in their entirety. This patent application therefore traces its priority date back to Jun. 27, 2000 and Oct. 26, 2000 with the filing of the above-referenced U.S. Provisional patent Applications.

TECHNICAL FIELD

Embodiments are related to electronic wireless hand held devices, such as Personal Digital Assistants (PDAs), mobile phones and data-enabled wireless telephones. Embodiments are also related to an electronic wireless hand held multimedia device capable of processing multimedia data including video on a touch sensitive display screen associated with the hand held device. In addition, Embodiments relate to techniques for providing electronic wireless hand held multimedia devices capable of multimedia data transmission and retrieval from multiple networks and wireless connections including: cellular (including 3G), 802.11 standard networks such as a wireless local area network (WLAN), and short range and/or line of sight communications standards and networks such as that supported by Bluetooth, IrDA (infrared), and RFID. Embodiments also relate to electronic wireless hand held multimedia devices capable of determining location information and directions using GPS and by displaying maps retrieved from remote servers (e.g., via the Internet) on touch sensitive display screens associated with the electronic wireless hand held multimedia devices. Embodiments also relate to electronic wireless hand held multimedia devices capable of moving data to/from, and operating with, a removable cartridge (e.g., external memory, smart card, card-based application modules and electronics).

BACKGROUND OF THE INVENTION

Electronic wireless hand held devices, such as, for example PDAs, mobile phones, data/video-enabled cellular telephones, and other hand held wireless video-enabled devices have become a part of everyday life. For example, the shift in the consumer electronics industry from an emphasis on analog technology to a preference for digital technology is largely based on the fact that the former generally limits the user to a role of a passive recipient of information, while the latter is interactive and allows the user to control what, when, and how he or she receives and manipulates certain information. This shift in focus has resulted in the development and increasingly widespread use of a digital device generically referred to as a "personal digital assistant" (PDA).

PDAs are hand held computing devices (i.e., hereinafter referred to as "hand held devices" or "handheld devices") that are popular for processing, storing and maintaining information. The most advanced data-enabled wireless communication devices available in the marketplace on Jun. 27, 2000, the priority date of this patent application, took the form of a PDA. Examples of hand held devices that could be utilized in accordance with the methods and systems of the present invention include the "PalmPilot™" PDA, manufactured and sold by Palm Computing, the Handspring Visor™, Window CE.TM. compatible devices, RIM™ Blackberry-family devices, Motorola devices, and the Symbol™ SPT-family of PDA-type organizer devices. Unlike personal computers, which are general-purpose devices geared towards refining and processing information, PDAs are designed to capture, store and display information originating from various sources while a user is "on the go" or otherwise mobile. Additionally, while a certain level of skill is required to use a personal computer effectively, PDAs are designed with the novice and non-computer user in mind and are therefore intuitively easy to use.

A typical PDA includes a microprocessor, memory unit, a display, associated encoder circuitry, and a user interface generally provided in the form of a keyboard and selector buttons. A PDA can optionally contain an infrared emitter and wireless receiver. A graphical user interface permits a user to store, retrieve and manipulate data via an interactive touch-sensitive display. A PDA can also include software that enables software applications for using a calendar, directory, calculator, games, and one or more multimedia programs. The calendar typically provides dates organized as rows and columns in the usual form. A directory contains entries consisting of a name field and a free form alphanumeric text field that can contain company names, addresses, telephone and fax numbers, email addresses, etc. Games and multimedia software features can vary.

A menu of icons displayed via the graphical user interface as pad of the touch sensitive screen can permit a user to choose particular functions and directories. Some PDAs come equipped with a stylus, which is a plastic-tipped pen that a user utilizes to write digitally on the display area and tap particular graphically displayed icons; although a user's figure nail can accomplish the same. Each icon is indicative of a particular activity or function. Touch screen interfaces, however, are also increasingly being implemented with PDAs to permit a user to activate software modules in the form of routines and subroutines operable therein.

Although it was generally known before Jun. 27, 2000 that PDAs can be connected to a desktop personal computer or other PDAs via infrared, direct wire, or a single wireless communication links, PDAs and similar hand held devices were not available that could selectively link to more than one wireless connection for purposes of accessing remote multimedia data and multimedia data sources, such as the Internet and remote servers. PDAs were not provided that included more than one wireless transceiver module to enable remote access via 802.11, cellular, short/visible range (e.g., Bluetooth), infrared, and GPS resources, and also provide enhanced computing capabilities including the capability of processing and viewing multimedia data such as video broadcasts.

In the year 2000, the present inventors realized when they filed their patent applications that what would be needed in the future, among other things, was an electronic wireless hand held multimedia device that could connect to various data networks and establish short/visible range data connections with electronic devices located in close proximity, provide multimedia capabilities including remotely accessing and displaying of video, enabling access to email and multimedia content from the Internet including servers and the World Wide Web, determining location information and enable the determination and provision of directions to alternate location by accessing remote map information and displaying the map information on the display touch sensitive display screen, a technique which can be referred to as GPS mapping, and enable mobile payments through the device, for example, by enabling hand held device users to be billed a transaction fee via bank accounts (e.g., ATM, Debit and Credit cards) billing via communication service accounts or arrangements, and prepaid services, and other authorized account-related billing arrangements. A security module can be provided to enable protected data retrieval and management by enabling the use of pass codes, passwords and/or biometrics as well as communications security over communications signals during hand held device use. A video camera and video transmission capabilities enable a user to capture, store, process and transmit video and take pictures.

BRIEF SUMMARY

One aspect of the present invention is to provide a vastly improved electronic wireless hand held multimedia device than what was publicly available prior to Jun. 27, 2000.

Another aspect of the present invention provides electronic wireless hand held multimedia device configured for the retrieval, processing and transmission of multimedia data to/from remote data resources over various wireless communications means.

It is yet another aspect of the present invention to provide an electronic wireless hand held multimedia device capable of communicating with a variety of different types of wireless networks.

It is yet another aspect of the present invention to provide an electronic wireless hand held multimedia device that includes a microprocessor and more than one wireless transceiver modules enabling wireless communications over a variety of communications standards, including Cellular (e.g., GSM, CDMA, GPRS, 3G), 802.11 (e.g., WLAN), and short range and/or line of sight range (e.g., Bluetooth, infrared, RFID), for the retrieval, processing and delivery of multimedia data to/from remote data resources (e.g., Internet, servers).

It is yet another aspect of the present invention that the hand held device can include any of the following: a touch sensitive display screen configured to display multimedia data including video, text and GPS maps, and accept user input; a cartridge reader configured to transfer data with an electronic cartridge; a GPS module configured to operate with mapping resources and provide location information in the form of GPS mapping; a mobile payment module enabling mobile payments via a variety of billing arrangements; a security module enabling protected data management and communications security; a video camera enabling the capture, storage, processing and transmission of video and pictures.

The above and other aspects of the present invention are achieved as will now be further described. An electronic wireless hand held multimedia device is disclosed, which includes more than one wireless transceiver modules configured for the receipt, processing and transmission of multimedia data to and from remote data resources over more than one standard of wireless communication. For example the electronic wireless hand held multimedia device includes a first wireless transceiver module configured to support bi-directional data communications of the electronic wireless hand held multimedia device with remote data resources over cellular telecommunications networks and standards (e.g., 3G, CDMA, GPRS, and GSM). The electronic wireless hand held multimedia device also includes a second wireless transceiver module configured to support bi-directional data communications of the electronic wireless hand held multimedia device with remote data resources over 802.11 communications standards and networks including wireless local area networks (WLAN). The electronic wireless hand held multimedia device can also include a third wireless transceiver module configured to support bi-directional data communications of the electronic wireless hand held multimedia device over a direct wireless connection with electronic devices located within short RF range or visible proximity of the electronic wireless hand held multimedia devices.

The electronic wireless hand held multimedia device can be equipped with a display screen configured to display data including video and text received by the electronic wireless hand held multimedia device. The electronic wireless hand held multimedia device can also include a user interface configured to accept user input into the electronic wireless hand held multimedia device. Additionally, the electronic wireless hand held multimedia device can also include a microprocessor configured to facilitate the operation of, and communications by, the electronic wireless hand held multimedia device.

The electronic wireless hand held multimedia device can additionally include a global positioning system (GPS) module configured to provide location information for the electronic wireless hand held multimedia device. The electronic wireless hand held multimedia device can also include a cartridge reader configured to transfer data with an electronic cartridge. Additionally, the third wireless transceiver module can be configured as a Bluetooth transceiver.

The electronic wireless hand held multimedia device can also include a fourth wireless transceiver module configured to support bi-directional data communications of the electronic wireless hand held multimedia device over an Infrared wireless connection with electronic devices located within visible proximity of the electronic wireless hand held multimedia device.

The electronic wireless hand held multimedia device can also include a fifth wireless transceiver module configured to support bi-directional data communications of the electronic wireless hand held multimedia device over an RFID wireless connection with electronic devices located within visible or short range from the electronic wireless hand held multimedia device.

A video camera and video transmission capabilities can be included that enable hand held device users to capture, store, process and transmit video and take pictures.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

Figure 1A:
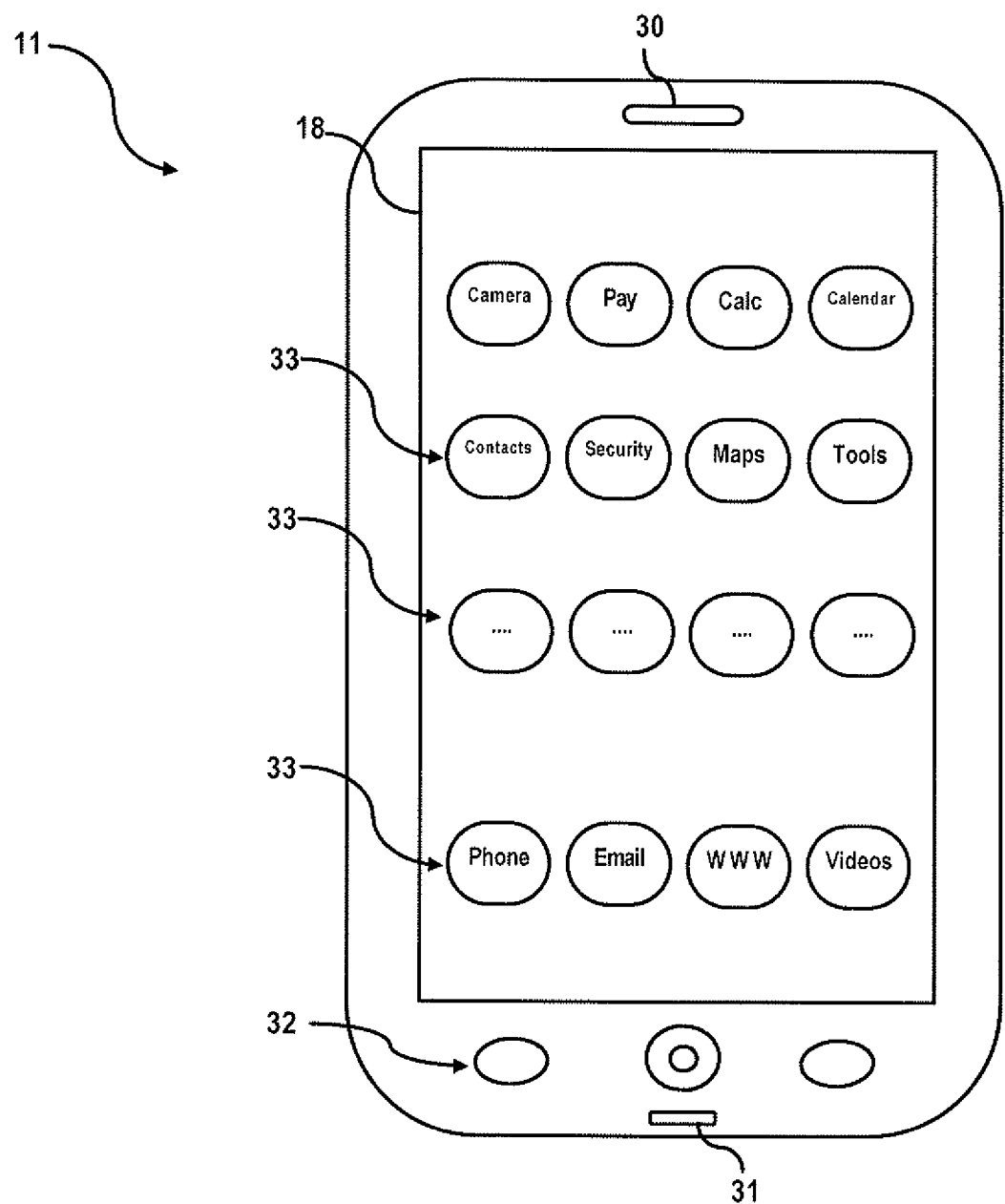
FIG. 1(a) illustrates a pictorial representation of an electronic wireless hand held multimedia device, which can be implemented in accordance with a preferred embodiment.

FIG. 1(a) illustrates a pictorial representation of an electronic wireless hand held multimedia device 11, which can be implemented in accordance with a preferred embodiment. Note that the device 11 can be referred to as a "handheld device", "hand held device" or a "wireless hand held device". Data can thus be transferred to and from the device 11. Note that as utilized herein, the term "data" as utilized herein generally refers to text, voice, graphics and/or video, but can include other types of data such as software, security codes, encryption, decryption, etc. Such data can include, for example, "multimedia data" such as video, voice, audio, etc.

In general, the electronic wireless hand held multimedia device 11 can include a touch sensitive display screen 18, a speaker 30, a microphone 31, and one or more control buttons 32 for controlling some operations of device 11. The device 11 depicted in FIG. 1(a) can be a device, such as, for example, a Personal Digital Assistant (PDA), a cellular telephone, a computing device capable of communicating with a wireless local area network, and so forth. In this respect, the device 11 can be implemented as a combined, PDA/cellular telephone with touch screen capabilities associated with the display screen 18. Display screen 18 can be configured to display data including video and text and icons 33 operable as soft buttons providing options and action by the electronic wireless hand held multimedia device 11 when selected by a user.

Figure 1B:
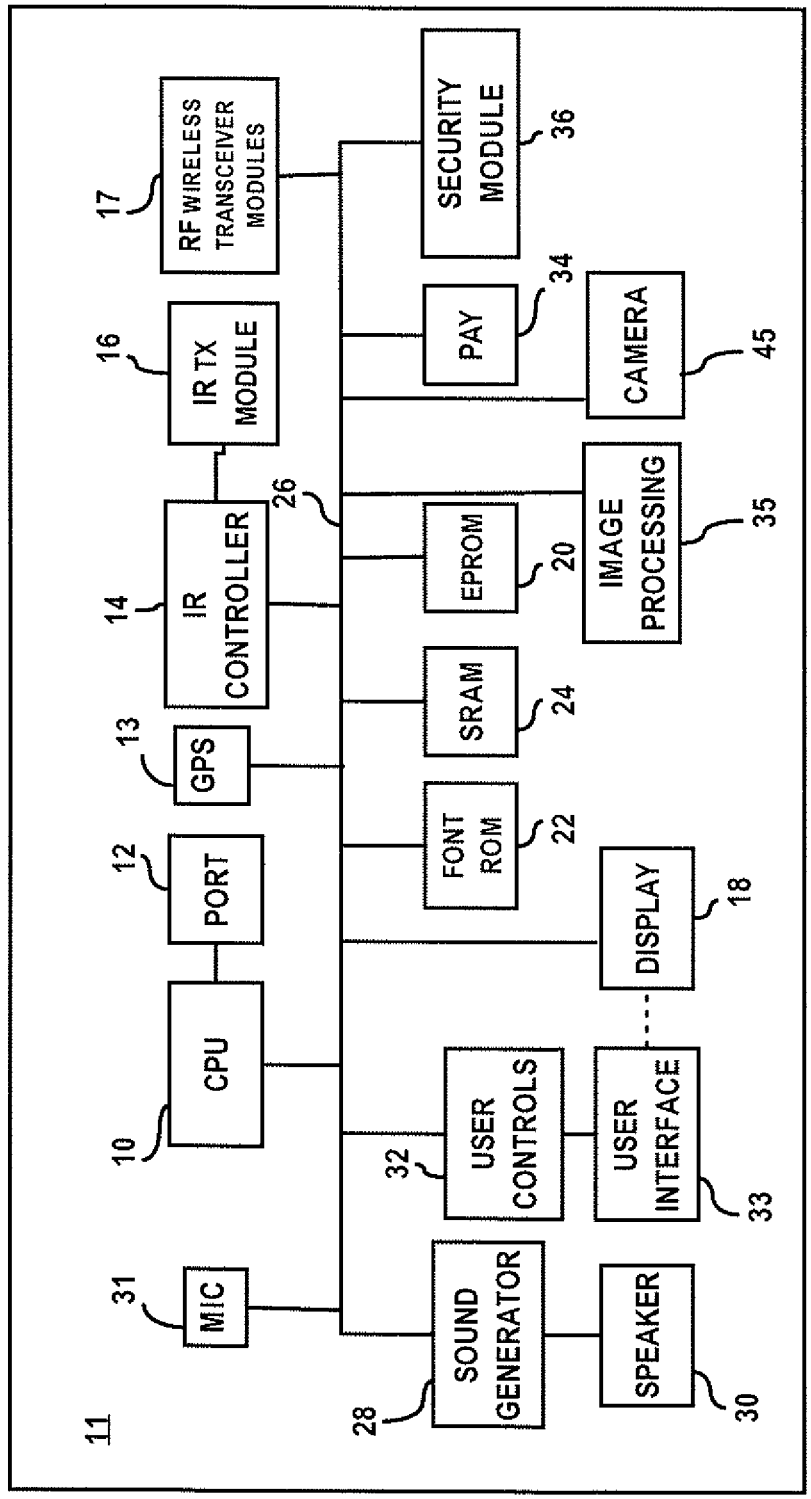
FIG. 1(b) depicts a schematic diagram illustrating exemplary hardware and software module configurations of an electronic wireless hand held multimedia device, which can be implemented in accordance with a possible embodiment.

FIG. 1(b) depicts a schematic diagram illustrating a general hardware configuration of an electronic wireless hand held multimedia device 11, which can be implemented in accordance with an embodiment. The diagram depicted in FIG. 1(b) illustrates a variety of hardware configurations and components/modules, which can be utilized to implement one possible embodiment of the device 11. Those skilled in the art can appreciate, however, that other hardware configurations with less or more hardware and/or modules can be utilized in carrying out the electronic wireless hand held multimedia device 11 of the present invention, as will be further described herein. Note that in FIGS. 1(a) to 5, identical or similar parts or elements are generally indicated by identical reference numerals. It can be appreciated that FIG. 1(a) to 5 may refer to the same device 11, the varying illustrations and configurations depicted in FIGS. 1(a) to 5 can represent variations or alternative embodiments of the same device 11.

The electronic wireless hand held multimedia device 11 is capable of carrying out a variety of functionalities. For example, microprocessor shown as CPU 10 of electronic wireless hand held multimedia device 11 can function as a main controller operating under the control of operating clocks supplied from a clock oscillator. CPU 10 can be configured as, for example, a microprocessor. Such a microprocessor can be configured to facilitate operation of and communications by the electronic wireless hand held multimedia device 11. External pins of CPU 10 can be coupled to an internal bus 26 so that it can be interconnected to respective components.

The electronic wireless hand held multimedia device 11 can also be configured to include, for example, SRAM 24 which can be provided as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., icons and font) displayable on a display 18, which can be implemented as, for example, a touch sensitive display screen. Examples of types of displays that can be utilized in accordance with display 18 include, for example, a TFT active matrix display, an illuminated LCD (Liquid Crystal Display), or other small-scaled displays being developed or available in the art in compact form.

CPU 10 can be utilized to drive display 18 utilizing, among other media, font images from Font ROM 22, and images transmitted as data through wireless unit 17 and processed by image-processing unit 35. EPROM 20 can be configured as a read only memory that is generally erasable under certain conditions and can be utilized for permanently storing control codes for operating respective hardware components and security data, such as a serial number. A camera capable of capturing video and pictures can be provided and can also work in conjunction with image processing unit 35.

IR controller 14 can be generally configured as a dedicated controller for processing infrared codes transmitted/received by an IR transceiver module 16 and for capturing the same as computer data. Wireless unit 17 can be generally configured as a dedicated controller and transceiver module for processing all wireless data transmitted from and to a wireless communications network, such as wireless communication network 152, which is described in greater detail herein, but not shown in FIG. 1.

Figure 1C:
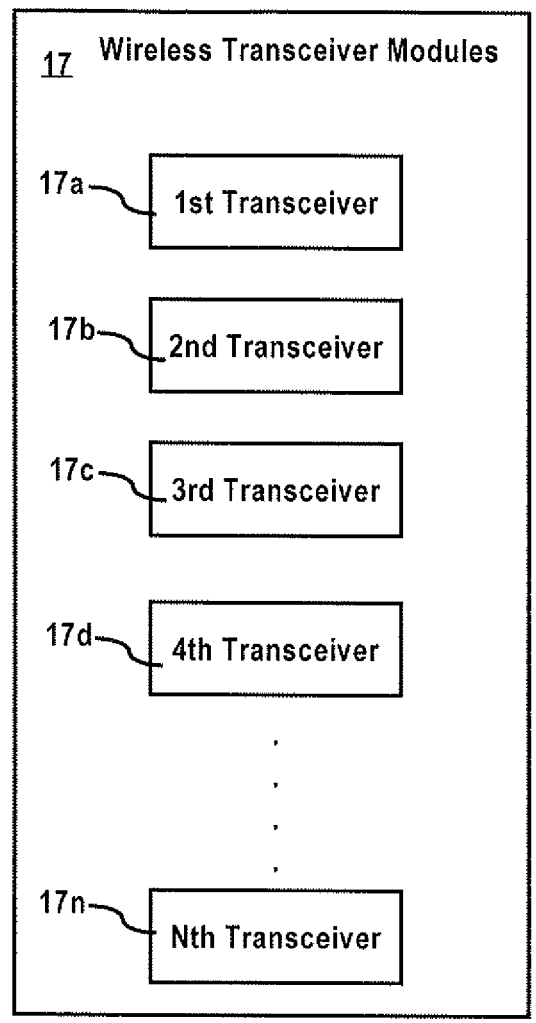
FIG. 1(c) illustrates a block diagram of wireless transceiver modules that can be configured for use with the electronic wireless hand held multimedia device described herein, in accordance with an alternative embodiment.

Note that the radio frequency (RF) wireless transceiver modules 17 (i.e. transceiver module) can constitute more than one wireless transceiver (e.g., multiple transceivers) formed separately or combined on an ASIC or DSP circuit. For example, FIG. 1(c) illustrates a block diagram of RF wireless transceiver modules 17 configured for use with the electronic wireless hand held multimedia device 11, in accordance with an alternative embodiment, including, for example, a first transceiver module 17a, a second transceiver module 17b, a third transceiver module 17c, a fourth transceiver module 17d, and up to an "$n^{th}$" transceiver module, and so on.

The first wireless transceiver module 17a can be configured, for example, to support bi-directional data communications of the electronic wireless hand held multimedia device 11 with remote data resources over cellular telecommunications networks. Wireless unit/transceiver module 17 can also include the second wireless transceiver module 17b configured to support bi-directional data communications of the electronic wireless hand held multimedia device 11 with remote data resources over a wireless local area network. Additionally, wireless transceiver module 17 can include the third wireless transceiver module 17c configured to support bi-directional data communications of the electronic wireless hand held multimedia device 11 over a direct wireless connection with electronic devices located at short range, for example, within up to a fifty to hundred foot range from the electronic wireless hand held multimedia device 11. Additionally, wireless unit/transceiver module 17 can include the fourth wireless transceiver module 17*d* configured to support bi-directional data communications of the electronic wireless hand held multimedia device 11 over an Infrared wireless connection with electronic devices located at line of sight (or "visible") range, which can reasonably be within up to a fifty foot range from the electronic wireless hand held multimedia device 11. It can be appreciated that other variations for wireless transceiver module 17 can also be provided.

Port 12 can be connected to CPU 10 and can be temporarily attached, for example, to a docking station to transmit information to and from electronic wireless hand held multimedia device 11 to other devices, such as personal computers, points of sale such as retail cash registers, electronic kiosk devices, and so forth. Port 12 can also be configured, for example, to link with a modem, cradle or docking station, which is well known in the art, and can permit network devices, a personal computer or other computing devices to communicate with electronic wireless hand held multimedia device 11.

User controls 32 can permit a user to enter data to electronic wireless hand held multimedia device 11 and initiate particular processing operations via CPU 10. A user interface 33 can be linked to user controls 32 to permit a user to access and manipulate electronic wireless hand held multimedia device 11 for a particular purpose, such as, for example, viewing video images on display 18. Those skilled in the art will appreciate that user interface 33 can be implemented as a touch screen user interface, as indicated by the dashed lines linking display 18 with user interface 33. User interface 33 can be configured to accept user input into the electronic wireless hand held multimedia device 11.

In addition, CPU 10 can cause a sound generator 28 to generate sounds of predetermined frequencies from a speaker 30. Speaker 30 can be utilized to produce music and other audio information associated with video data transmitted to electronic wireless hand held multimedia device 11 from an outside source. Additionally, a GPS (Global Positioning System) module 13 can also be connected to bus 26. GPS module 13 can be configured to provide location information for the electronic wireless hand held multimedia device 11 and can operate with mapping software and resources to provide navigable directions on the display screen 18 to the user, which can be referred to as GPS mapping.

Those skilled in the art can appreciate that additional electronic circuits or the like other than, or in addition to, those illustrated in FIG. 1 can be required to construct electronic wireless hand held multimedia device 11. PDAs can be modified to (e.g., with proper authentication, filters, security codes, biometrics or the like) receive RF transmissions from at least one source (e.g., server, a wireless camera, or data from a camera transmitted wirelessly through a local data transmitter using Wi-Fi). Those skilled in the art can thus appreciate that because of the brevity of the drawings described herein, only a portion of the connections between the illustrated hardware blocks is generally depicted. In addition, those skilled in the art will appreciate that electronic wireless hand held multimedia device 11 can be implemented as a specific type of a hand held device, such as a Personal Digital Assistant (PDA), paging device, WAP-enabled mobile phone, and other associated hand held computing devices well known in the art.

Electronic wireless hand held multimedia device 11 can be configured to permit images, such as broadcasted video images or other multimedia data, to be displayed on display 18 for a user to view. Electronic wireless hand held multimedia device 11 thus includes an image-processing unit 35 for processing images transmitted as data to electronic wireless hand held multimedia device 11 through wireless unit 17. A payment module 34 can be implemented in the device 11 to enable the management of payment transactions which can be negotiated wirelessly through the device, for example, by enabling hand held device users to be billed a transaction fee via bank accounts (e.g., ATM, Debit and Credit cards) billing via communication service accounts or arrangements, and prepaid services, and other authorized account-related billing arrangements. Payment can be made directly to a wireless point of sale and/or over data networks. A security module can be provided to enable protected data retrieval and management by enabling the use of pass codes, passwords and/or biometrics and communications security during hand held device communications. A video camera and video transmission capabilities enable user to capture, store, process and transmit video and take pictures. Payment module 34 can be linked through internal bus 26 to CPU 10. Additionally, a security module 36 can be utilized to process proper security codes to thereby ensure data (e.g., multimedia data) transferred to and from electronic wireless hand held multimedia device 11 can be secured and/or access can be permitted. Security unit 36 can be implemented as an optional feature of electronic wireless hand held multimedia device 11. Security unit 36 can also be configured with routines or subroutines that are processed by CPU 10, and which prevent wireless data from being transmitted/received from electronic wireless hand held multimedia device 11 beyond a particular frequency range, outside of a particular geographical area associated with a local wireless network, or absent authorized authorization codes (e.g., decryption).

Those skilled in the art can appreciate that although electronic wireless hand held multimedia device 11 is generally illustrated in FIG. 1, electronic wireless hand held multimedia device 11 can be implemented as a wireless application protocol (WAP), web-enabled cellular hand held device, such as a PDA, wireless telephone, or a combination thereof. Electronic wireless hand held multimedia device 11 can be configured with features of combination cellular telephone/PDA devices. Electronic wireless hand held multimedia device 11 can also permit users to access e-mail and store calendars and contact databases. Electronic wireless hand held multimedia device 11 can also be configured to include the use of multi-RF (Radio Frequency) receiver-enabled hand held television viewing device. Regardless of the type of hand held device implemented, it can be expected that such a hand held device will be adapted to receive and process data via image-processing unit 35 for ultimate display as moving images (video) on display 18, in accordance with the present invention. Image-processing unit 35 can include image-processing routines, subroutines, software modules, and so forth, which perform image-processing operations.

Figure 2:
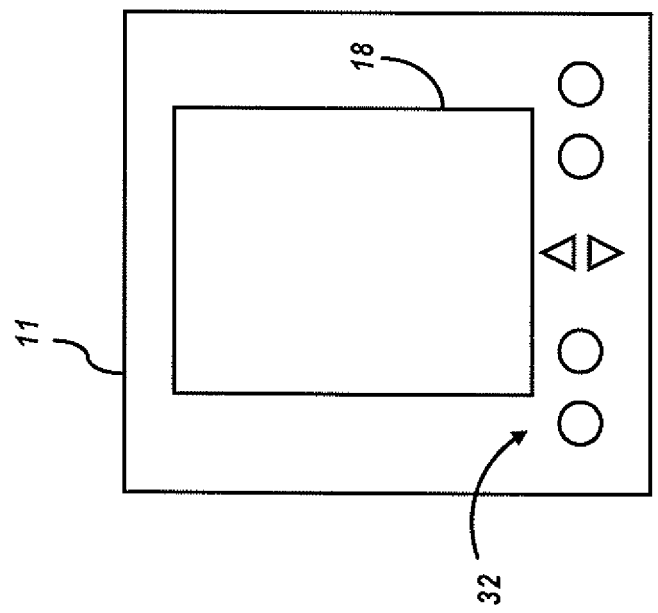
FIG. 2 illustrates a pictorial representation of an electronic wireless hand held multimedia device, which can be implemented in accordance with an alternative embodiment.

FIG. 2 illustrates a pictorial representation of electronic wireless hand held multimedia device 11, which can be utilized to implement a preferred embodiment. Electronic wireless hand held multimedia device 11 includes display screen 18. Multimedia data (e.g., video, audio, graphics, etc) broadcast via radio frequency or provided digitally and wirelessly can be displayed on display screen 18 for a user to view. User controls 32 permit a user to manipulate images or text displayed on display screen 18, such as the buttons on a keyboard provided on most Blackberry devices. A touch screen user interface can be further configured on the display screen 18 with electronic wireless hand held multimedia device 11 to permit a user to manipulate images/text displayed on display screen 18.

Figure 3:
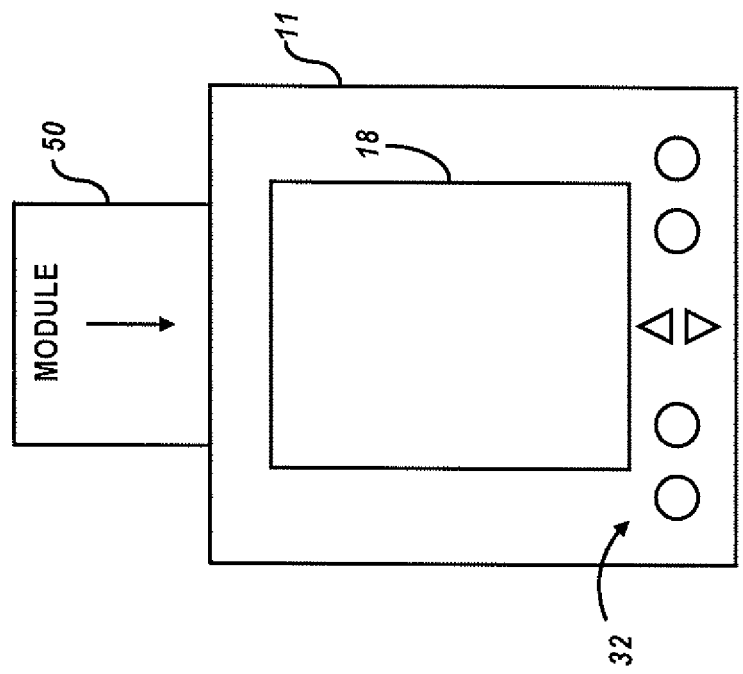
FIG. 3 depicts a pictorial representation of an electronic wireless hand held multimedia device adapted for receiving a cartridge, in accordance with an alternative embodiment.

FIG. 3 depicts a pictorial representation of electronic wireless hand held multimedia device 11 adapted for receiving a cartridge 50, in accordance with an alternative embodiment. Electronic wireless hand held multimedia device 11 of FIG. 3 is generally analogous to electronic wireless hand held multimedia device 11 of FIG. 2, the difference being that electronic wireless hand held multimedia device 11 of FIG. 3 can be adapted to receive a cartridge bearing software and/or hardware modules (including memory) that permits electronic wireless hand held multimedia device 11 of FIG. 3 to function according to specific hardware and/or instructions contained in a memory location within cartridge 50. The alternative embodiment depicted in FIG. 3 thus represents a variation to the embodiment illustrated in FIG. 2.

Cartridge 50 can be configured as a smart card of another appropriate module. Such a smart card can provide, for example, access codes (e.g., decryption) to enable electronic wireless hand held multimedia device 11 to receive data broadcasts. Note that as utilized herein, the term "module" can refer to a physical module, such as a cartridge. The term "module" can also refer to electronics and hardware stored on a cartridge. The term "module" can also refer to a software module composed of routines or subroutines that perform a particular function. Those skilled in the art can appreciate the meaning of the term module is based on the context in which the term is utilized. Thus, cartridge 50 can be generally configured as a physical cartridge or smart card. The term "module" as utilized herein can also refer to a software module, depending on the context of the discussion thereof.

To illustrate the use of a physical module, such as module 50, assume that a user can possess several such physical modules or cartridges. One cartridge, when inserted into hand held device FIG. 3 can instruct hand held device 11 to function as a standard PDA, such as a Palm Pilot type device. Other functions including communications, software, memory and supplemental circuitry can be provided using a cartridge that can be inserted within and removed from the electronic wireless hand held multimedia device 11.

Those skilled in the art can thus appreciate that electronic wireless hand held multimedia device 11 can be adapted to receive and cooperate with cartridge 50. Additionally, electronic wireless hand held multimedia device 11 includes display screen 18, which is similar to display unit 18 of FIG. 1. Electronic wireless hand held multimedia device 11 depicted in FIG. 3 can also include user controls 32. Thus, electronic wireless hand held multimedia device 11 can also implement touch screen capabilities through a touch screen user interface integrated with display screen 18.

Assuming cartridge 50 is implemented as a smart card, it is anticipated that similar features can be implemented in accordance with the smart card to insure that hand held device 11 includes touch screen user interface 18 and video viewing capabilities. Smart cards are generally known in the art as credit-card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards can be generally configured as either a contact or contactless smart card, or a combination thereof. A contact smart card requires insertion into a smart card reader (e.g., contained within hand held device 11) with a direct connection to, for example, a conductive micromodule on the surface of the card. Such a micromodule can be generally gold plated. Transmission of commands, data, and card status takes place through such physical contact points.

A contactless card requires only close proximity to a reader. Both the reader and the card can be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized with low to medium security requirements. A microprocessor chip can add, delete and otherwise manipulate information in its memory. Microprocessor-based memory cards typically contain microprocessor chips with a variety of architectures.

The electronic wireless hand held multimedia device 11 of FIGS. 1-3 can be configured as a hand held device adapted for use with a cartridge/module, such as module 50. The cartridge/module 50 can contain the electronics (e.g., tuner, filter, etc.) to allow a hand held device to be adapted for receiving multimedia data. Electronic wireless hand held multimedia device 11 includes a display screen 18 for the display of multimedia data. Additionally, display screen 18 of electronic wireless hand held multimedia device 11 can be configured with a touch screen user interface displayable and operable on display screen 18. Display screen 18 can include one or more touch screen areas.

Figure 4:
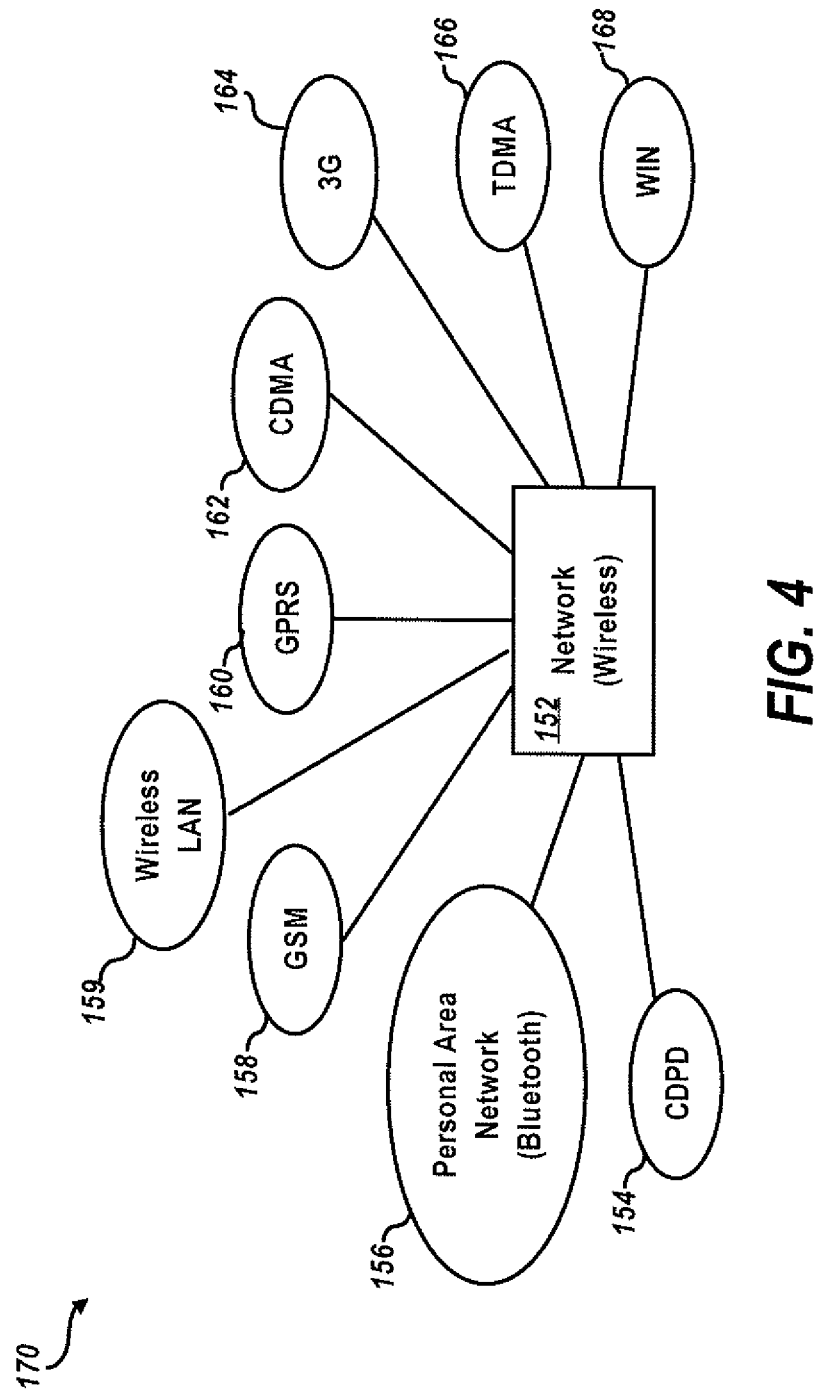
FIG. 4 illustrates a diagram depicting network attributes of wireless communications networks that can be utilized in accordance with the preferred embodiments.

Those skilled in the art can appreciate that a variety of possible wireless communications and networking configurations can be utilized to implement wireless network 152, as shown in FIG. 4. Wireless network 152 can be, for example, implemented according to a variety of wireless protocols, including cellular, Bluetooth, and RF or direct IR communications. Wireless network 152 can be implemented as a single network type (e.g., Bluetooth) or a network based on a combination of network types (e.g., GSM, CDMA, etc).

Wireless network 152 can be configured with teachings/aspects of CDPD (Cellular Digital Packet Data) networks well known in the networking arts. CDPD network 154 is illustrated in FIG. 4. CDPD can be configured as a TCP/IP based technology that supports Point-to-Point (PPP) or Serial Line Internet Protocol (SLIP) wireless connections to mobile devices, such as the hand held devices described and illustrated herein. Cellular service is generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 152 can preferably be also configured with teachings/aspects of a Personal Area Network 156 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein. It should be appreciated that all the wireless transceiver modules and capabilities described herein can be built into small application specific circuits (ASICS, DSPs) and embedded into support devices, such as the hand held devices described and illustrated herein.

The Bluetooth standard permits up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 152 can also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Wireless network 152 can also be, for example, a wireless LAN (Local Area Network). In other embodiments or implementations, wireless network 152 can also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 152 can also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

CDMA can support data. Wireless network 152 can be configured with a form of CDMA technology known as wideband CDMA (W-CDMA). Wideband CDMA can be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 152 can be also implemented utilizing teachings/aspects of a 3G wireless communications network 164. As a result of increased competition and the ongoing convergence of voice and data networks, new solutions and services are becoming available in the wired and wireless communications fields. Third Generation communications technology (also referred to in the art as 3G or IMT-2000), for example, is currently expected to bring wireless communication users the next generation of wireless technology. 3G is characterized by high-speed, high-bandwidth services that will support a wide variety of wireless applications, including wireline quality voice and high-resolution video. 3G is an initiative of the International Telecommunication Union (ITU) that seeks to integrate the various satellite, terrestrial, fixed and mobile systems currently deployed and being developed under a single standard or family of standards to promote global communication service capabilities and interoperability.

Wireless network 152 can also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user can be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 152 can also be configured utilizing teachings/aspects of Wireless Intelligent Networks (WINs)

168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semi-permanent mobile subscriber (wireless device user) information for wireless carriers' entire subscriber base.

A useful aspect of WINs for the present invention is enabling the maintenance and use of customer profiles within an HLR/VLR-type database. Profile information can be utilized for example with season ticket holders and/or fans of traveling teams or shows. HLR subscriber information as used in WINs includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR can also be configured as a database that contains temporary information concerning the mobile subscribers currently located in a given MSC serving area, but whose HLR can be elsewhere. When a mobile subscriber roams away from the HLR location into a remote location, SS7 messages are used to obtain information about the subscriber from the HLR and create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to affect wireless and wireline call setup, routing, control, services, enhanced features and secure communications. Such systems and standards can be utilized to implement wireless network 152 in support of wireless customers, in accordance with the present invention.

Improved operating systems and protocols allow Graphical User Interfaces (GUI) to provide an environment that displays user options (e.g., graphical symbols, icons or photographs) on the display screen 18 of the electronic wireless hand held multimedia device 11. Extensible Markup Language ("XML") is a standard that is available that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML can effectively enable one system to translate what another system sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Figure 5:
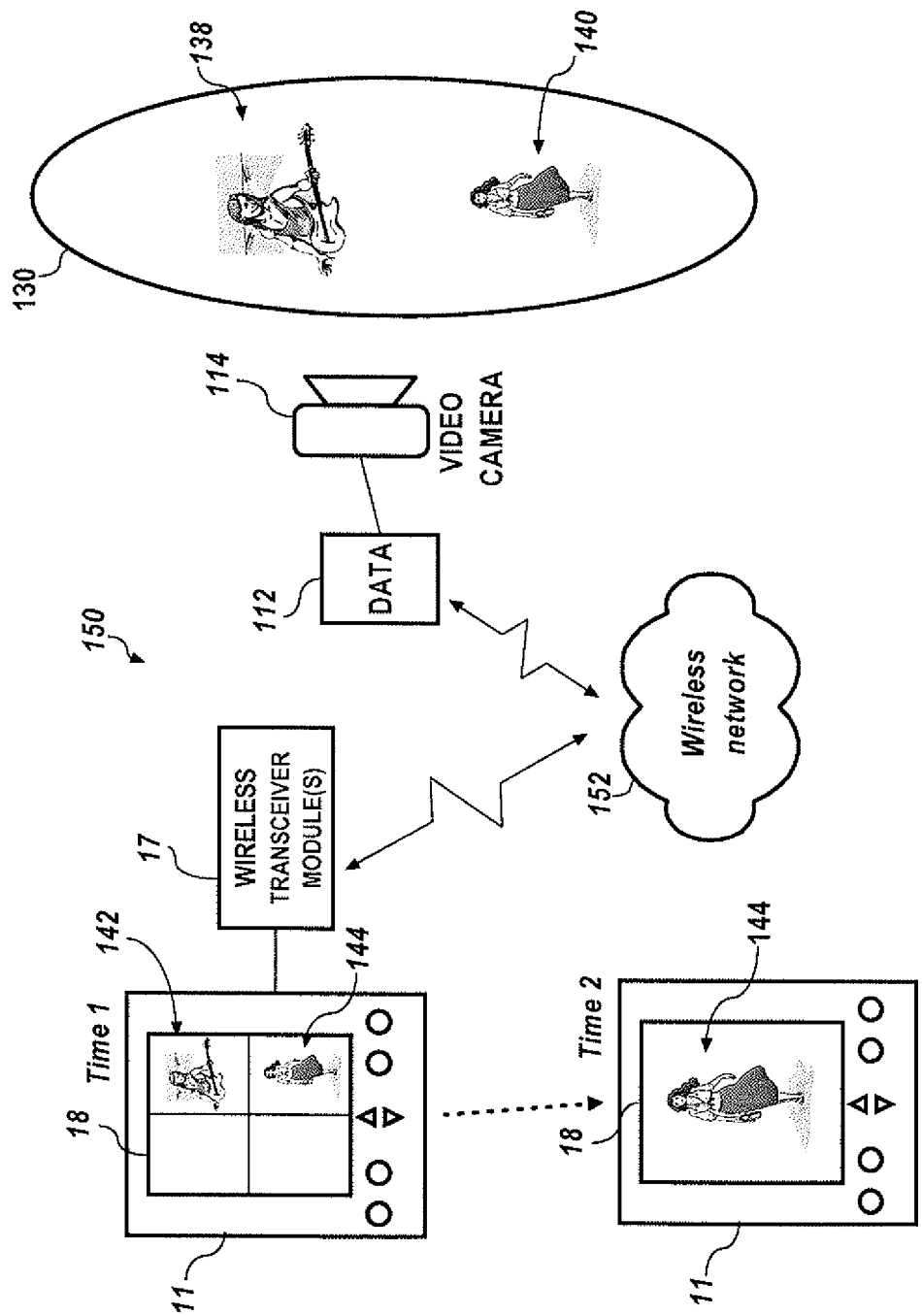
FIG. 5 illustrates a diagram of one example of a system for providing multimedia data to electronic wireless hand held multimedia device, in accordance with an alternative embodiment.

FIG. 5 illustrates a diagram of a system 150 providing multimedia data to electronic wireless hand held multimedia device wherein the multimedia data is received and processed for display, in accordance with the embodiments. Note that in FIGS. 1-5, identical or similar parts or elements are generally indicated by identical reference numerals. Multimedia data can be created or captured, for example, as shown in FIG. 5 by a video camera 114 from live activity 130, such as a concert 138 or private activities 140. The multimedia data can be stored on a server 112 as data wherefrom it can be retrieved through a data network 152 by the wireless handheld device 11. The data network 152 can include a wireless network as described herein before such as a cellular data network, 802.11 networks, or another type of data transmissions such as indicated in FIG. 4. Data network 152 can include, for example, the use of a gateway configured as an access point for a wireless LAN (Local Area Network). Access points for wireless LAN networks and associated wired and wireless hardware (e.g., servers, routers, gateways, etc.) can be utilized in accordance with the present invention described herein. In the example depicted in FIG. 5, an electronic wireless hand held device user can desire to obtain multimedia data (e.g., video, audio, etc.) being broadcast from a multimedia data source 130, for example, a live entertainment venue shown as an example remote data source 130 in FIG. 5, which can be a concert hall or sports stadium.

Hand held device 11 can be configured to communicate with and receive transmissions from remote data sources 112 over data networks 152 based on device identification (e.g., device address). Communication with hand held devices, such as hand held device 11, however, can also be achieved through RF (Radio Frequency) broadcasts, thereby not requiring two-way communication and authentication between, for example, a wireless LAN network and such hand held devices. A broadcast under such a scenario can also require that such a hand held device or hand held devices possess decryption capabilities or the like in order to be authorized to receive transmissions from a remote data resource. More than one wireless transceiver module 17, as explained previously, are integrated within hand held device 11 to enable access to multimedia data over various wireless communications means.

In one aspect of the scenario depicted in FIG. 5, a live activity instead of recorded media can be accessed and viewed using an electronic wireless hand held multimedia device 11. In a live scenario, one or more video cameras 114 can be positioned at a live entertainment venue as the data resource 130 at locations that capture images not only of the events taking place on a concert stage, but also events taking place within the venue itself. For example, if an audience member 140 happens to be walking along a stadium aisle within view of video camera 114, the audience member's video image can be captured and displayed as video image 144 within display screen 18 of hand held device 11, as indicated at Time 1. Likewise, video camera 114 can capture images of band member 138 whose video image can be displayed as video image 142 within a display area of display screen 18, as indicated at Time 1. Thus, a user of hand held device 11 can view not only the events taking place on a central performing platform of venue, but also other events within the arena itself. The user of device 11 can be located within a venue or many miles, perhaps, thousands of miles away, from a venue. The band member 138 can be located on a central performing platform (not shown) of a multimedia data source 130 in the form of a venue when video camera 114 captures video of band member 138. The user can also, for example, wish to see a close-up of audience member 140. By activating user controls and/or a touch screen interface integrated with display screen 18, the user can, for example, pan or zoom to view a close-up video shot of audience member 140, as indicated at Time 2. Captured video images can be transferred from video camera 114 as video data to hardware 112 such as a server. From the server 112, video can be accessed and transferred over the wireless network 152 to the device 11.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An electronic wireless hand held multimedia device, comprising:
   at least one of a wireless unit and a tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
   a touch sensitive display screen configured to display the data including video and text received by the electronic wireless hand held multimedia device by selecting a particular data represented by a soft button on the touch sensitive display screen of the electronic wireless hand held multimedia device; and
   a microprocessor configured to facilitate operation of and communications by the electronic wireless hand held multimedia device.

2. The electronic wireless hand held multimedia device of claim 1, further comprising a global positioning module configured to provide location information for the electronic wireless hand held multimedia device.

3. The electronic wireless hand held multimedia device of claim 1, further comprising a cartridge reader configured to transfer data with an electronic cartridge.

4. The electronic wireless hand held multimedia device of claim 1, further comprising a mobile payment module enabling mobile payments via a variety of billing arrangements.

5. The electronic wireless hand held multimedia device of claim 1, further comprising a security module enabling protected data management and communications security.

6. The electronic wireless hand held multimedia device of claim 1, further comprising a video camera enabling the capture, storage, processing and transmission of video and pictures.

7. The electronic wireless hand held multimedia device of claim 1, further comprising a wireless infrared transceiver supporting bi-directional line-of-site data communications of the electronic wireless hand held multimedia device over an Infrared wireless connection with electronic devices located within line of sight from the electronic wireless hand held multimedia device.

8. An electronic wireless hand held multimedia device, comprising:
   at least one of a wireless unit and a tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
   a touch sensitive display screen configured to display the data including video and text by selecting a particular data represented by a soft button on the touch sensitive display screen of the electronic wireless hand held multimedia device and to accept user input; and
   a microprocessor configured tO facilitate operation of and communications by the electronic wireless hand held multimedia device.

9. The electronic wireless hand held multimedia device of claim 8, further comprising a global positioning module configured to provide location information for the electronic wireless hand held multimedia device.

10. The electronic wireless hand held multimedia device of claim 8, further comprising a cartridge reader configured to transfer data with an electronic cartridge.

11. The electronic wireless hand held multimedia device of claim 8, further comprising a wireless infrared transceiver supporting bi-directional line-of-sight data communications of the electronic wireless hand held multimedia device over an Infrared wireless connection with electronic devices located within line of sight from the electronic wireless hand held multimedia device.

12. The electronic wireless hand held multimedia device of claim 8, further comprising a mobile payment module enabling mobile payments via a variety of billing arrangements.

13. The electronic wireless hand held multimedia device of claim 8, further comprising a security module enabling protected data management and communications security.

14. The electronic wireless hand held multimedia device of claim 8, further comprising a video camera enabling the capture, storage, processing and transmission of video and pictures.

15. An electronic wireless hand held multimedia device, comprising:
   at least one of a wireless unit and tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
   a touch sensitive display screen configured to display the data including video and text by selecting a particular data represented by a soft button on the touch sensitive display screen of the electronic wireless hand held multimedia device and to accept user input;

a global positioning module configured to provide device location information; and a microprocessor configured to facilitate operation of and communications by the electronic wireless hand held multimedia device.

16. The electronic wireless hand held multimedia device of claim 15, further comprising a cartridge reader configured to transfer data with an electronic cartridge.

17. The electronic wireless hand held multimedia device of claim 15, further comprising a wireless infrared transceiver supporting bi-directional line-of-sight data communications of the electronic wireless hand held multimedia device over an Infrared wireless connection with electronic devices located within line of sight from the electronic wireless hand held multimedia device.

18. The electronic wireless hand held multimedia device of claim 15, further comprising a mobile payment module enabling mobile payments via a variety of billing arrangements.

19. The electronic wireless hand held multimedia device of claim 15, further comprising a security module enabling protected data management and communications security.

20. The electronic wireless hand held multimedia device of claim 15, further comprising a video camera enabling the capture, storage, processing and transmission of video and pictures.

21. An electronic wireless hand held multimedia device, comprising:
at least one of a wireless unit and tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
a touch sensitive display screen configured to display the data including video and text by selecting a particular data represented by a soft button on the touch sensitive display screen of the electronic wireless hand held multimedia device and to accept user input;
a cartridge reader configured to transfer data with an electronic cartridge; and
a microprocessor configured to facilitate operation of and communications by the electronic wireless hand held multimedia device.

22. The electronic wireless hand held multimedia device of claim 21, further comprising a global positioning module configured to provide device location information.

23. The electronic wireless hand held multimedia device of claim 21, further comprising a wireless infrared transceiver supporting bi-directional line-of-sight data communications of the electronic wireless hand held multimedia device over an Infrared wireless connection with electronic devices located within line of sight from the electronic wireless hand held multimedia device.

24. The electronic wireless hand held multimedia device of claim 21, further comprising a mobile payment module enabling mobile payments via a variety of billing arrangements.

25. The electronic wireless hand held multimedia device of claim 21, further comprising a security module enabling protected data management and communications security.

26. The electronic wireless hand held multimedia device of claim 21, further comprising a video camera enabling the capture, storage, processing and transmission of video and pictures.

27. An electronic wireless hand held multimedia device, comprising;
at least one of a wireless unit and tuner unit supporting bi-directional data communications of data including video and text for the electronic wireless hand held multimedia device with remote data resources over cellulartelecommunications networks, over wireless local area networks and over a direct wireless connection with electronic devices located, within short range using Bluetooth communications after accepting a passcode from a user of the electronic wireless hand held multimedia device during the communications;
a touch sensitive display screen configured to display the data including video and text by selecting a particular data represented by a soft button on the touch sensitive display screen of the electronic wireless hand held multimedia device and to accept user input;
a global positioning module configured to provide device location information;
a cartridge reader configured to receive and communicate with an electronic cartridge; and
a microprocessor configured to facilitate operation of and communications by the electronic wireless hand held multimedia device.

28. The electronic wireless hand held multimedia device of claim 27, further comprising a mobile payment module enabling mobile payments via a variety of billing arrangements.

29. The electronic wireless hand held multimedia device of claim 27, further comprising a security module enabling protected data management and communications security.

30. The electronic wireless hand held multimedia device of claim 27, further comprising a video camera enabling the capture, storage, processing and transmission of video and pictures.

31. The electronic wireless hand held multimedia device of claim 27, further comprising a wireless infrared transceiver supporting bi-directional line-of-sight data communications of the electronic wireless hand held multimedia device over an Infrared wireless connection with electronic devices located within line of sight from the electronic wireless hand held multimedia device.

32. An electronic wireless hand held multimedia device, comprising:
at least one of a wireless unit and tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
a wireless infrared transceiver supporting bi-directional line-of-sight data communications of the electronic wireless hand held multimedia device over an Infrared wireless connection with electronic devices located within line of sight from the electronic wireless hand held multimedia device;
a touch sensitive display screen configured to display the data including video and text and by selecting a particular data represented by a soft button on the touch sensitive display screen of the electronic wireless hand held multimedia device to accept user input;
a cartridge reader configured to receive and communicate with an electronic cartridge; and
a microprocessor configured to facilitate operation of and communications by the electronic wireless hand held multimedia device.

33. The electronic wireless hand held multimedia device of claim 32, further comprising a global positioning module configured to provide location information for the electronic wireless hand held multimedia device.

34. An electronic wireless hand held multimedia device, comprising:
at least one of a wireless unit and tuner unit supporting bi-directional data communications of data including video and text for the electronic wireless hand held multimedia device with remote data resources over cellular telecommunications networks, over wireless local area networks and over a direct wireless connection with electronic devices located within short range using Bluetooth communications after accepting a passcode from a user of the electronic wireless hand held multimedia device during the communications;
a wireless infrared transceiver supporting bi-directional line-of-sight data communications of the electronic wireless hand held multimedia device over an Infrared wireless connection with electronic devices located within line of sight from the electronic wireless hand held multimedia device;
a touch sensitive display screen configured to display the data including video and text by selecting a particular data represented by a soft button on the touch sensitive display screen of the electronic wireless hand held multimedia device and to accept user input;
a global positioning module configured to provide location information for the electronic wireless hand held multimedia device;
a cartridge reader configured to receive and communicate with an electronic cartridge; and
a microprocessor configured to facilitate operation of and communications by the electronic wireless hand held multimedia device.

35. The electronic wireless hand held multimedia device of claim 34, further comprising a mobile payment module enabling mobile payments via a variety of billing arrangements.

36. The electronic wireless hand held multimedia device of claim 34, further comprising a security module enabling protected data management and communications security.

37. The electronic wireless hand held multimedia device of claim 34, further comprising a video camera enabling the capture, storage, processing and transmission of video and pictures.

* * * * *